United States Patent
Tanaka

(10) Patent No.: US 7,178,489 B2
(45) Date of Patent: Feb. 20, 2007

(54) VARIABLE VALVE SYSTEM OF INTERNAL COMBUSTION ENGINE AND HYDRAULIC ACTUATOR

(75) Inventor: Hirohisa Tanaka, Tokyo (JP)

(73) Assignee: Yokohama TLO Company, Ltd., Kanagawa (JP)

( * ) Notice: Subject to any disclaimer, the term of this patent is extended or adjusted under 35 U.S.C. 154(b) by 0 days.

(21) Appl. No.: 10/550,726

(22) PCT Filed: Dec. 15, 2003

(86) PCT No.: PCT/JP03/16035

§ 371 (c)(1),
(2), (4) Date: Jan. 23, 2006

(87) PCT Pub. No.: WO2004/085858

PCT Pub. Date: Oct. 7, 2004

(65) Prior Publication Data

US 2006/0150934 A1    Jul. 13, 2006

(30) Foreign Application Priority Data

Mar. 24, 2003   (JP) .............................. 2003-080100

(51) Int. Cl.
*F01L 9/02* (2006.01)
(52) U.S. Cl. .................. 123/90.12; 123/90.13; 91/172; 251/12
(58) Field of Classification Search ............ 123/90.12, 123/90.13; 91/170 R, 172, 182, 183, 399; 137/906; 251/12; 92/6 R
See application file for complete search history.

(56) References Cited

U.S. PATENT DOCUMENTS

| 5,595,148 A | 1/1997 | Letsche et al. |
| 6,857,403 B2 * | 2/2005 | Diehl et al. ............... 123/90.12 |

FOREIGN PATENT DOCUMENTS

EP      0738826      10/1996

(Continued)

*Primary Examiner*—Thomas Denion
*Assistant Examiner*—Ching Chang
(74) *Attorney, Agent, or Firm*—Young & Thompson

(57) ABSTRACT

In a hydraulic actuator comprising a hydraulic piston, a hydraulic cylinder and a hydraulic pressure source wherein said hydraulic piston has a larger area exposed to pressure on the side of the control chamber than on the side of oil supply chamber of said hydraulic cylinder, wherein said hydraulic piston has, in its outer peripheral part, a slot connecting said oil supply chamber side with the control chamber side in the direction of shaft and the cross sectional area of the slot in the direction of said shaft changes according to the displacement of the hydraulic piston in the direction of its shaft, and the control chamber has a pilot valve, the suction and exhaust valve in a variable valve system of the internal combustion engine are opened and closed by said hydraulic actuator through a coupling and springs for the valve, for variably controlling the opening and closing timing, the opening and closing time, and the lift of the valve, whereby it is possible to provide a variable valve system for internal combustion engine that is a cam-less and sensor-less, and a hydraulic actuator that enable to reduce power consumption and to improve response speed, and to control landing speed so that a smooth landing may be realized.

11 Claims, 7 Drawing Sheets

FOREIGN PATENT DOCUMENTS

| | | |
|---|---|---|
| EP | 0849439 | 6/1998 |
| EP | 1270881 | 1/2003 |
| JP | 49-035767 | 4/1974 |
| JP | 58-170809 | 10/1983 |
| JP | 60-040711 | 3/1985 |
| JP | 7-049011 | 2/1995 |
| JP | 11-351207 | 12/1999 |
| WO | 01/075278 | 10/2001 |

* cited by examiner

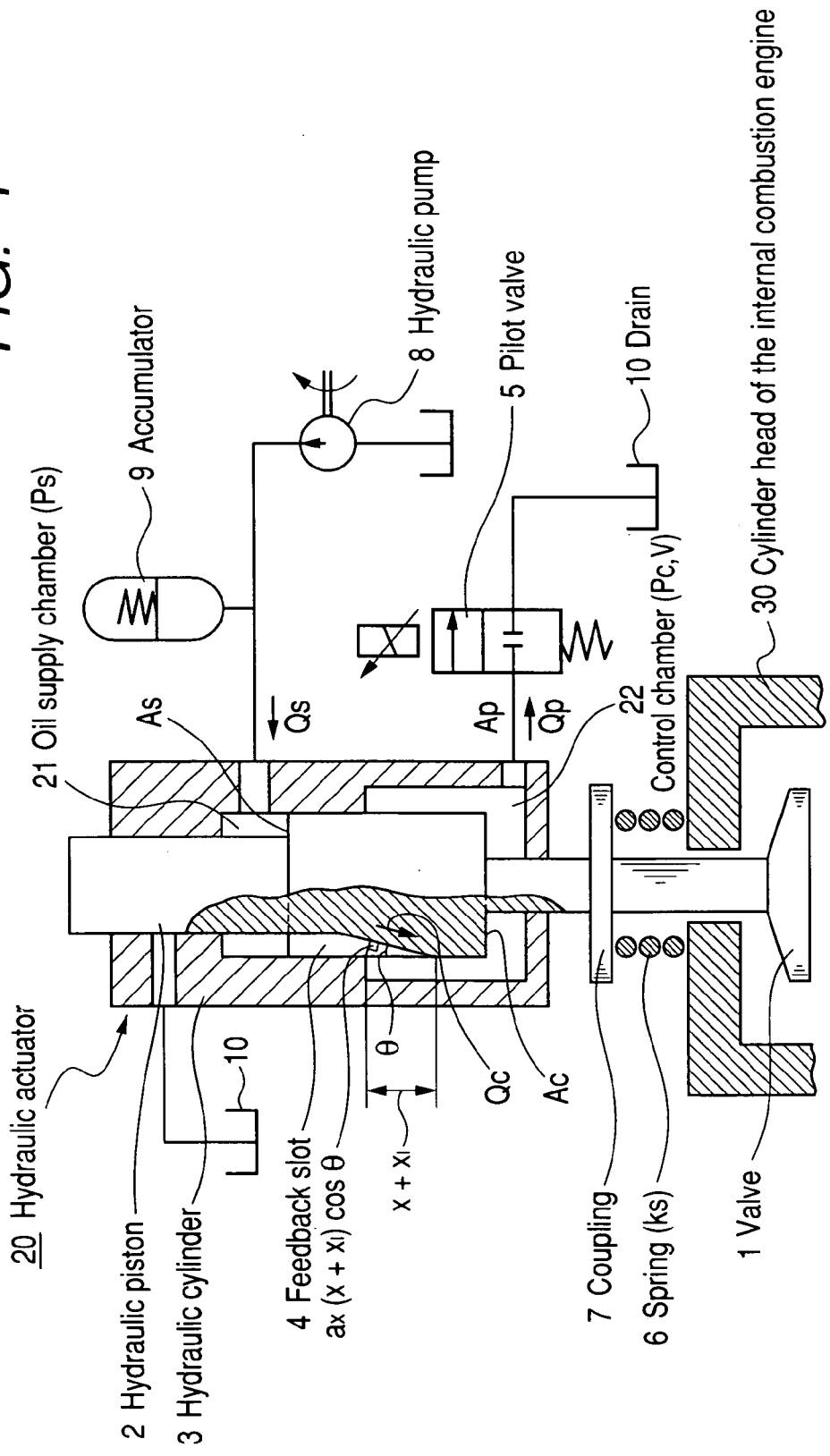

VARIABLE VALVE SYSTEM OF INTERNAL COMBUSTION ENGINE AND HYDRAULIC ACTUATOR

TECHNICAL FIELD

The present invention relates to a hydraulic actuator and a variable valve system of internal combustion engine and a method of controlling the same wherein the suction valve and exhaust valve of an internal combustion engine are opened and closed by the hydraulic actuator.

BACKGROUND ART

The hydraulic actuator is used in machine tools and for other industrial uses in general as well as in driving devices of suction and exhaust valves of internal combustion engines. As the valves governing the suction and exhaust of the internal combustion engine have been driven by a crank shaft in the prior system, it has not been possible to freely control the timing and degree of opening of suction and exhaust valves.

LPG and CNG (compression natural gas) engines on which much expectation has been entertained as alternative engines in recent years suffer from strong knockings especially while they are running at a high speed. In order to solve this problem, the method of controlling freely the compression pressure of engine piston is effective, and in order to realize this, a mechanism of freely controlling electrically the opening/closing timing of the suction valve is necessary. The adoption of this mechanism enables even ordinary gasoline engines and Diesel engines to improve suction efficiency and fuel efficiency in a wide range of rotation speed. In addition, in the case of low speed and that of high speed, it becomes necessary to change the opening are of the valve and to change combustion performance. In this case, it becomes necessary to make the valve lift variable.

Some of recent high performance engines change the opening and closing timing of valves by advancing or retarding the angle of cam shaft or by changing the aperture of valve by switching between two types of cam for the valve, one for low speed and the other for high speed. In this case, however, only stepped control is possible. And as valve for cam-less engine, electromagnetic valves or valves combining electromagnetic type and hydraulic type have been proposed. However, these types tend to be excessively large or heavy and are not so practical (see for example Patent Documents 1 and 2).

Furthermore, as a cam-less and relatively small and light system, an electric hydraulic servo mechanism for the valve of internal combustion engine wherein a hydraulic servo mechanism having a larger operating power is put into action by electric signals is proposed (see for example Patent Document 3 and Non-Patent Document 1).

An example of the structure of a valve driving device disclosed in FIG. 1 of the Patent Document 3 is shown in FIG. 11. However, part numbers shown in FIG. 11 are partially changed from those shown in the Patent Document 3. The devices shown in FIG. 11 work as described below according to the description of the Patent Document 3.

Specifically, "the engine lubricating oil contained in the engine lubricating oil reservoir 12 placed within the engine is pressurized by a hydraulic pump 11 to be sent to the head of the suction and exhaust valve 1a. The hydraulic piston 2a at the head of the suction and exhaust valve 1a is put into action by the action of each electromagnetic solenoid 14 to open and close the suction and exhaust valve 1a. The opening and closing timing and the opening and closing time of the suction and exhaust valve 1a are determined as described in Table 1 of the Patent Document 3 based on the comprehensive judgment by the control computer for the opening and closing device of the suction and exhaust valve 6a of the signals received from various sensors 7a of the engine on the basic conditions such as engine speed, throttle opening, load and the like and the signals from the control computer for fuel control 8a used in the present engine and the hydraulic pressure is opened and closed by the electromagnetic solenoid 14." Incidentally, in FIG. 11, 3a represents a hydraulic control valve, 5a represents a power battery, 9a represents an accumulator for accumulating hydraulic pressure, 10a represents a relief valve for setting pressure, and 13 represents a control relay.

The electro-hydraulic servomechanism for valves described in the Non-Patent Document 1 has been proposed by the inventor of the present patent application, and adopts a structure consisting of a hydraulic piston, a two-stage servo-valve (nozzle flap valve and spool valve), a displacement meter for measuring electrically the position of the piston.

Incidentally, the prior electro-hydraulic servomechanisms for valves described in the Patent Document 3 and the Non-Patent Document 1 involved the following problems in their actual use.

In the case of the prior devices, for example in the case of the device described in the Non-Patent Document 1, due to the use of a simple hydraulic piston, the mounting of a displacement meter for electric position sensors and the use of the servo-valve (two-stage type, nozzle flap valve and spool valve) with a low motive power efficiency of 33% at the maximum for control, the power consumption of the servomechanism is large, and due to a limit in responsiveness, the whole device was able to cope with an engine speed of approximately 2,000 rpm. Furthermore, electric sensors were problematic because of strong vibrations and reliability of their operation at a high temperature, and these problems constituted a bottleneck for their actual use.

In addition, in the opening and closing control of the valve of internal combustion engines, it is desirable that mechanical shocks be reduced to the minimum at the time of closing the valve from the viewpoint of vibration and life. In other words, a smooth landing control is required for reducing the landing velocity of the valve

[Patent Document 1]
Japanese Patent Application Laid Open 1995-34833 (p 3–5, FIG. 1)

[Patent Document 2]
Japanese Patent Application Laid Open 1999-511828 (p 11–12, FIGS. 5, 6)

[Patent Document 3]
Japanese Patent Application Laid Open 1999-173125 (p 2–4, FIGS. 1, 2)

[Non-Patent Document 1]
Hirohisa Tanaka: "Digital control and application of hydraulics and pneumatics," published by Kindai Tosho K.K. on Oct. 25, 1987, p. 83–84.

The present invention was realized in view of the issues mentioned above, and the object of the present invention is to provide a cam-less and sensor-less variable valve system of internal combustion engine and a hydraulic actuator that enable to reduce power consumption, improve response speed and control smoothly landing speed.

DISCLOSURE OF THE INVENTION

In order to solve the issues described above, the present invention includes a hydraulic actuator comprising a reciprocal hydraulic piston, a hydraulic cylinder and a hydraulic pressure source wherein said hydraulic piston has a larger area exposed to pressure on the side of the control chamber than on the side of oil supply chamber of said hydraulic cylinder, wherein said hydraulic piston has, in its outer peripheral part, a slot connecting said oil supply chamber side with the control chamber side in the direction of shaft and the cross sectional area of the slot in the direction of said shaft changes according to the displacement of the hydraulic piston in the direction of its shaft, and said control chamber has a hydraulic pressure release control valve (invention according to claim 1).

According to the structure described above, a quantity of oil corresponding to the displacement in the shaft direction of the hydraulic piston flows in the slot, and the position of the hydraulic piston can be freely controlled according to the flow of oil discharged from the hydraulic pressure release control valve as described in details later on. In other words, the slot functions as a position feedback slot without any position sensor, and the hydraulic pressure release control valve functions as a pilot valve for positioning.

A mode of carrying out the hydraulic pressure release control valve in the invention according claim 1 described above can be a solenoid controlled pilot operated valve (invention according to claim 2) or an electro-hydraulic proportional control valve (invention according to claim 3) in relation to the variable control of the valve lift mentioned below. In any case, according to the mode of carrying out mentioned above, the position of the hydraulic piston can be controlled freely by electric signals.

Then, as inventions wherein the hydraulic actuator described above is applied to a variable valve system of internal combustion engine, claims 4–7 described below are preferable. In other words, a variable valve system of internal combustion engine for opening and closing a suction valve for aspirating gas into the internal combustion engine and an exhaust valve for exhausting combustion gas by a hydraulic actuator through a coupling and a spring for the valve, and for variably controlling the opening and closing timing and the opening and closing time of said valve, wherein the hydraulic actuator according to said claim 1 or claim 2 is used as said hydraulic actuator, and said valve is variably controlled by controlling said hydraulic pressure release control valve (invention according to claim 4). According to this structure, it is possible to provide a cam-less and sensor-less variable control system cable of reducing power consumption and of improving response speed as compared with the prior systems.

And when it is necessary to add the variable control of valve lift in addition to the opening and closing timing and the opening and closing time of the valve as variable control of the valve, the invention of the claim 5 described below is preferable. In other words, a variable valve system of internal combustion engine for opening and closing a suction valve for aspirating gas into the internal combustion engine and an exhaust valve for exhausting combustion gas by a hydraulic actuator through a coupling and a spring for the valve, and for variably controlling the opening and closing timing, the opening and closing time and the lift of said valve, wherein the hydraulic actuator according to said claim 3 is used as said hydraulic actuator, and said valve is variably controlled by controlling said hydraulic pressure release control valve (invention according to the claim 5).

And in the variable valve system described in claim 4 or 5 above, the cross sectional area of said slot in the direction of the shaft gradually decreases as said hydraulic piston displaces in the closing direction of said valve (invention according to claim 6). This mitigates and slows the landing speed of the valve and enables to control landing speed so that the valve may land smoothly. The details will be described further below.

And in the variable valve system according to claim 6, the structure of the gradually decreasing the cross sectional area of said slot consists of gradually changing the groove depth of the slot while the groove width is kept constant (invention according to claim 7). This will simplify the structure of the slot and facilitates the manufacturing process of the hydraulic piston having the slot.

And as for the invention for the control method of variable valve system, the invention according to claim 8 described below is preferable. Specifically, in the control method of variable valve system described in the claim 4 or 5, for the closing operation of said valve, said hydraulic pressure release control valve is switched from OPEN to CLOSE followed by at least another operation of opening and closing the hydraulic pressure release control valve to close said valve (invention according to claim 8). This will enable to control landing at a reduced speed wherein the landing speed of the valve is further reduced, and to further reduce the noise of valve operation as described in details further below.

BRIEF DESCRIPTION OF THE DRAWINGS

FIG. 1 is a schematic diagram describing the working principle of the variable valve system of internal combustion engine and the hydraulic actuator of the present invention.

DESCRIPTION OF CODES

Figure 2B:
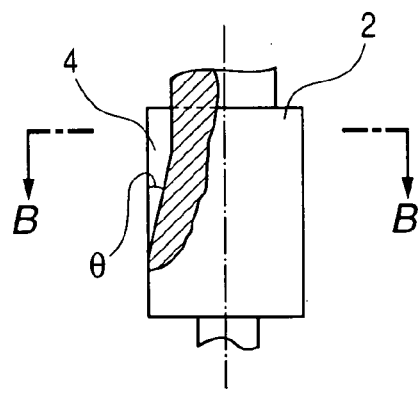
FIG. 2 is a partially cutaway view of an embodiment of hydraulic piston showing a substantially enlarged width of the feedback slot according to FIG. 1.
Figure 2A:
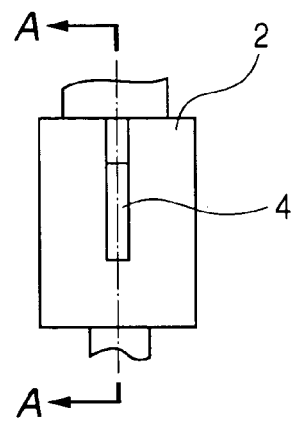
Figure 2D:
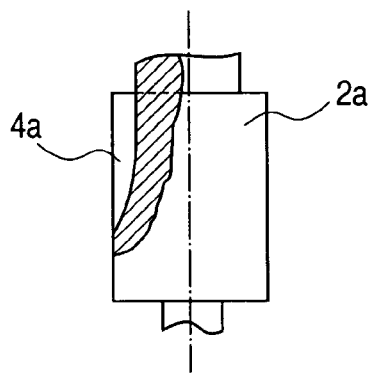
Figure 2C:
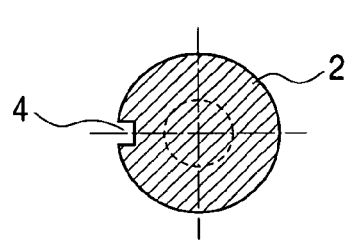

1: Valve
2, 2a, 2b: Hydraulic piston
3: Hydraulic cylinder
4, 4a, 4b: Feedback slot
5: Pilot valve
6: Spring 7: Coupling
8: Hydraulic pump
9: Accumulator
10: Drain
20: Hydraulic actuator
21: Oil supply chamber
22: Control chamber
30: Cylinder head of internal combustion engine

THE BEST MODE FOR CARRYING OUT THE INVENTION

We will now describe the mode of carrying out and an embodiment of the present invention with reference to drawings.

Figure 3B:
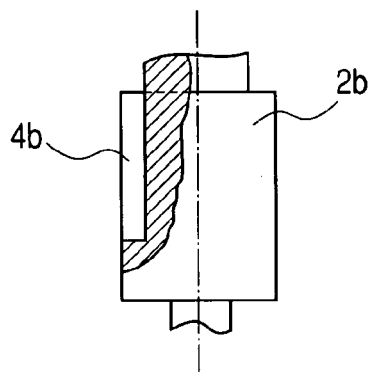
FIG. 3 is a partially cutaway view of an embodiment of hydraulic piston different from FIG. 2.
Figure 3A:
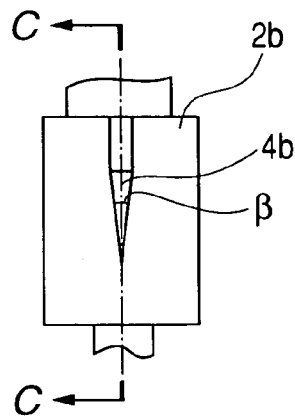

FIG. 1 is a schematic diagram describing the working principle of the variable valve system for internal combustion engine and the hydraulic actuator according to the present invention. FIG. 2 is a partially cutaway view of an embodiment of hydraulic piston showing, for the convenience of description, a considerably enlarged view of the groove width of the feedback slot shown in FIG. 1, and FIG. 3 is a partially cutaway view of another embodiment of hydraulic piston different from FIG. 2.

In FIG. 1, the code 1 represents a valve (the main valve for controlling the suction into and exhaust from the engine), 2 represents a hydraulic piston (the hydraulic piston for operating the valve 1), 3 represents a hydraulic cylinder (the cylinder fitting the hydraulic piston 2), 4 represents a feedback slot (channel for controlling the flow rate of oil according to the displacement of the piston), 5 represents a pilot valve (electromagnetic opening and closing valve or proportional valve for controlling the flow rate of oil flowing out of the feedback slot), 6 represents a spring for the valve (spring for keeping the valve locked in the cylinder head 30 of the internal combustion engine while the system is inoperative), 7 represents a coupling (a mechanical element for connecting the valve 1 with the hydraulic piston 2), 8 represents a hydraulic pump (hydraulic pump for supplying high-pressure oil for operating the hydraulic piston 2), and 9 represents an accumulator (a hydraulic device for leveling oil pressure to prevent oil pressure from declining or pulsing while the hydraulic piston 2 is working).

Furthermore, in FIG. 1, the code 10 represents an oil drain. And the code 20 represents a hydraulic actuator consisting of the hydraulic piston 2, the hydraulic cylinder 3 and other peripherals (4, 5, 8, 9, 10 and the like), 21 represents an oil supply chamber and 22 represents a control chamber.

The feedback slot 4 is structured, for example, as shown in FIG. 2 (a)–(c) (we will describe later on variations such as the ones shown in FIG. 2 (d) and FIG. 3). FIG. 2 (b) is a cross sectional view along A—A of FIG. 2 (a) and is the same partially cutaway view as shown in FIG. 1, and FIG. 2 (c) is a cross sectional view along B—B of FIG. 2 (b). As shown in FIG. 2 (a)–(c), the feedback slot 4 has a rectangular groove whose sectional area in the direction of its shaft gradually decreases proportionally as the hydraulic piston 2 moves in the closing direction of the valve, and the groove width is constant and the groove depth gradually changes by an angle of inclination θ. On the side of the oil supply chamber 21 having the angle of inclination θ, the feedback slot has a straight groove portion for the oil flow without any angle of inclination.

Incidentally, the groove width shown in FIG. 2 is considerably enlarged than its actual dimension for the convenience of description. And although it is preferable from the viewpoint of dynamic balance to create grooves at two separate and symmetrical points on the shaft, only one groove may be created as shown in the figure if the groove width is tiny.

We will now describe the working principle of the variable valve system and the hydraulic actuator shown in FIG. 1. The hydraulic piston is a piston of a singular form (for example Ac/As=1.2) of which the control chamber 22 side (area exposed to pressure Ac) has a larger area exposed to pressure than the oil supply chamber 21 side (area exposed to pressure As) as shown in the figure and, as described above, has a feedback slot 4 whose opening area is variable according to the displacement of the piston from the oil supply chamber side.

The action of closing the valve 1 causes the pilot valve 5 to close and reduces the flow rate of oil through the pilot valve to nil (Qp=0). The setting of the feedback slot 4 to be slightly open even while the valve 1 is closed causes the hydraulic pressure Pc on the control chamber 22 side to be equal to the high hydraulic pressure Ps supplied to the oil supply chamber 21 by the hydraulic pump 8, and because of the relative magnitude of area, the hydraulic piston 2 works upward (in the closing direction of the valve), and keeps the valve closed with a strong force (F=Ps(As−Ac)<0).

Then the action of opening the valve causes the pilot valve 5 to open, and when Qp is allowed to flow, the pressure Pc of the control chamber 22 decreases, and a downward force (F=AsPs−AcPc>0) exerts on the hydraulic piston 2, and the hydraulic piston 2 moves downward. As a result of the downward movement of the hydraulic piston, a flow rate Qc proportional to the displacement flows into the control chamber from the feedback slot 4 of the piston, and the piston stops at a point of striking balance with the pilot flow rate Qp (Qc=Qp). At this time, the pressure Pc in the control chamber 22 is a pressure determined unconditionally by the difference in area of the hydraulic piston 2 and the spring force of the spring attached to the valve 1, and controls the position of the hydraulic piston 2.

As any displacement of the hydraulic piston 2 is unconditionally determined by the opening area of the pilot valve 5, when a proportional valve opening variably by electric signals is used as the pilot valve 5, the opening of the valve, in other words, the valve lift can be controlled freely by electric signals.

Before describing in more details the theoretical description of the action mentioned above and an example of experiment results, we will describe below the variants (4a, 4b) of feedback slot shown in FIG. 2 (d) and FIG. 3. The variant of FIG. 2 (d) shows the case of replacing a linear inclination of the groove bottom having an angle of inclination θ shown in FIG. 2 (b) by a curved inclination. And FIG. 3 shows a variant wherein a groove with a variable sectional area in the shaft direction of the slot is replaced by a groove of a constant depth and a variable width with the width variable by an angle β shown in FIG. 3 (a). Incidentally, FIG. 3 (b) shows the section C—C of FIG. 3 (a). Although these variants enable to obtain effects similar to the embodiment shown in FIG. 2 (a)–(c), the groove shown in FIG. 2 (a)–(c) is simple in form, and it offers an advantage of enabling easy processing by, for example, milling.

We will now describe the theoretical description of the operation of the system shown in FIG. 1 and an example of results of experiments. Incidentally, various codes shown in the numerical formulae of operation analyses are as follows:

Ac: Area exposed to pressure on the side of the control chamber

Ap: Opening area of the pilot valve

As: Area exposed to pressure on the side of the oil supply chamber
$a_x$: Inclination of the feedback slot
b: Damped ratio of the main valve
Cdc: Flow rate coefficient (feedback slot)
Cdp: Flow rate coefficient (pilot valve)
K: Bulk modulus of elasticity of working fluid
$k_a$ Spring constant of the valve spring
m: Variable mass of the valve
Pc: Pressure in the control chamber
Ps: Supply pressure
Qc: Flow rate through the feedback slot
Qp: Flow rate through the pilot valve
Qs: Supply flow rate
V: Volume of the control chamber
Wc: Width of the feedback slot
x: Displacement of the valve
$x_1$: Underlap
$x_p$: Opening of the pilot valve
ρ: Density of the working fluid We will examine in the first place the control characteristics of the valve displacement x relative to the opening of the pilot valve $x_p$. The movement numerical formula of the valve 1 is as shown in the following "Numerical formula 1."

$$m\frac{d^2x}{dt^2} + b\frac{dx}{dt} + k_s x = A_s P_s - A_c P_c - F_d \quad \text{[Numerical formula 1]}$$

Here, Fd represents an external force that pushes up the piston by the internal pressure in the cylinder.

Then, the flow rate through the pilot valve Qp is shown by the following [Numerical formula 2].

$$Q_p = C_{dp} A_p \sqrt{\frac{2}{\rho} P_c} \quad \text{[Numerical formula 2]}$$

The feedback slot 4 of the piston will be relatively deep relative to displacement, and when its inclination is set at $a_x$ ($a_x$=tan θ) and its width at Wc, its channel area Sx will be as shown in the following [Numerical formula 3].

$$S_x = a_x W_c(x+x_1)\cos\theta \quad \text{[Numerical formula 3]}$$

Based on the numerical expression above, the flow rate Qc from the groove can be acquired from the following [Numerical formula 4].

$$Q_c = C_{dc} S_x \sqrt{\frac{2}{\rho}(P_s - P_c)} \quad \text{[Numerical formula 4]}$$

The flow rate succession formula in the control chamber 22 is as shown in the following [Numerical formula 5].

$$Q_c - Q_p + A_c \frac{dx}{dt} = \frac{V_c}{K}\frac{dP_c}{dt} \quad \text{[Numerical formula 5]}$$

When the flow rate formula above is shown by linear numerical expressions, it can be expressed by the following [Numerical formula 6] and [Numerical formula 7].

$$Q_p = k_{qp} x_p + k_{cp} P_c \quad \text{[Numerical formula 6]}$$

$$Q_c = k_{qc} x - k_{cc} P_c \quad \text{[Numerical formula 7]}$$

When this relationship is substituted for the [Numerical formula 5] above, the following [Numerical formula 8] can be obtained.

$$k_{qc} x - k_{cc} P_c - k_{qp} x_p - k_{cp} P_c + A_c \frac{dx}{dt} = \frac{V}{K}\frac{dP_c}{dt} \quad \text{[Numerical formula 8]}$$

The Laplace transform formula of this [Numerical formula 8] is the following [Numerical formula 9].

$$\left(k_{cc} + k_{cp} + \frac{V}{K}s\right) P_c = (k_{qc} + A_c s) x - k_{qp} x_p \quad \text{[Numerical formula 9]}$$

On the other hand, the Laplace transform formula of the movement numerical formula of the piston is as shown in the following [Numerical formula 10] under a constant supply pressure.

$$(ms^2 + bs + k_s)x = -A_c P_c - F_d \quad \text{[Numerical formula 10]}$$

Figure 4:
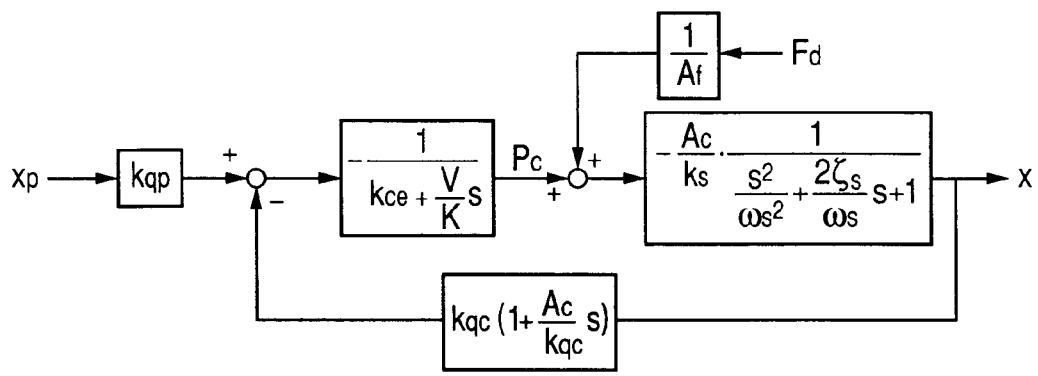
FIG. 4 is a block diagram of transfer function of the piston displacement to the opening of pilot valve.

The block diagram of the transfer function of the piston displacement x relative to the opening of the pilot valve $x_p$ is shown in FIG. 4. Here, each coefficient is substituted as shown in [Numerical formula 11] below.

$$k_{ce} = k_{cc} + k_{cp},\ \omega_s = \sqrt{\frac{k_s}{m}},\ \zeta_s = \frac{b}{2\sqrt{mk_s}} \quad \text{[Numerical formula 11]}$$

The limit of stability of this system can be expressed by the following [Numerical formula 12].

$$4\zeta_s^2 + \frac{2\zeta_s[\alpha + \omega_s^2 T_v(T_c + \alpha T_v)]}{\alpha \omega_s T_v} + \frac{1}{\alpha}\left(\frac{T_c}{T_v} - 1\right) > 0 \quad \text{[Numerical formula 12]}$$

Here, $\alpha = k_s k_{ce}/k_{qc} A_c$, $T_v = V/K k_{ce}$, and $T_c = A_c/k_{qc}$.

The solution of the [Numerical formula 12] above in connection with the damped ratio ζs of the piston will result in the following [Numerical formula 13].

$$\zeta_s > \frac{1}{4}\left\{-A + \sqrt{A^2 - 4\frac{1}{\alpha}\left(\frac{T_c}{T_v} - 1\right)}\right\} \quad \text{[Numerical formula 13]}$$

However, A in the numerical formula above is substituted for the following [Numerical formula 14].

$$A = \frac{1 + \omega_s^2 T_c(T_c + \alpha T_v)}{\omega_s T_c} \quad \text{[Numerical formula 14]}$$

When the design value of the present actuator is substituted for each member to calculate Tv and Tc, respectively Tv=1.31×10$^{-9}$ and Tc=5.56×10$^{-3}$. Therefore, Tc/Tv>1, and the square root part of the [Numerical formula 13] will be smaller than A. In other words, as the right side of the [Numerical formula 13] is always negative and the damped ratio ζs positive, this servomechanism satisfies the stability criterion.

The issues related with the electro-hydraulic pressure driven valve are, as described above, the reduction of power consumption, responsiveness and controllability of landing speed. Therefore, we analyzed by a bond graph the step response of the present actuator and hydraulic power required transitively.

The bond graph is a graphic expression (diagram) of a system wherein an attention is paid to grasping from a common viewpoint that the component elements of a fluid system consisting of fluid resistance, tank and fluid inertia, electric circuits consisting of resistances, capacitors, inductors and the like, a dynamic system consisting of rigid bodies, springs, dumpers, and the like are linked by the flow of energy. In this bond graph proposed by Henry M. Paynter of the Massachusetts Institute of Technology, the inlet and outlet of energy in each element are called "ports," the transfer route of energy between the ports is expressed by a segment of line called "bond," and the confluence and branching of energy flow are indicated by "one contact point" and "zero contact point."

Generally, the whole behavior of a system composed of a large number of elements show up as a synergetic effect between the proper characteristic of each element and the combined form of these elements. As described above, the bond graph grasps well the physical characteristics of the system and it is easy to express the objective system by a bond graph. As the bond graph enables to express visually the characteristics and form of linkage of elements in an easily understandable form, it is effective to understand the composition of systems and to analyze their behavior.

Figure 5:
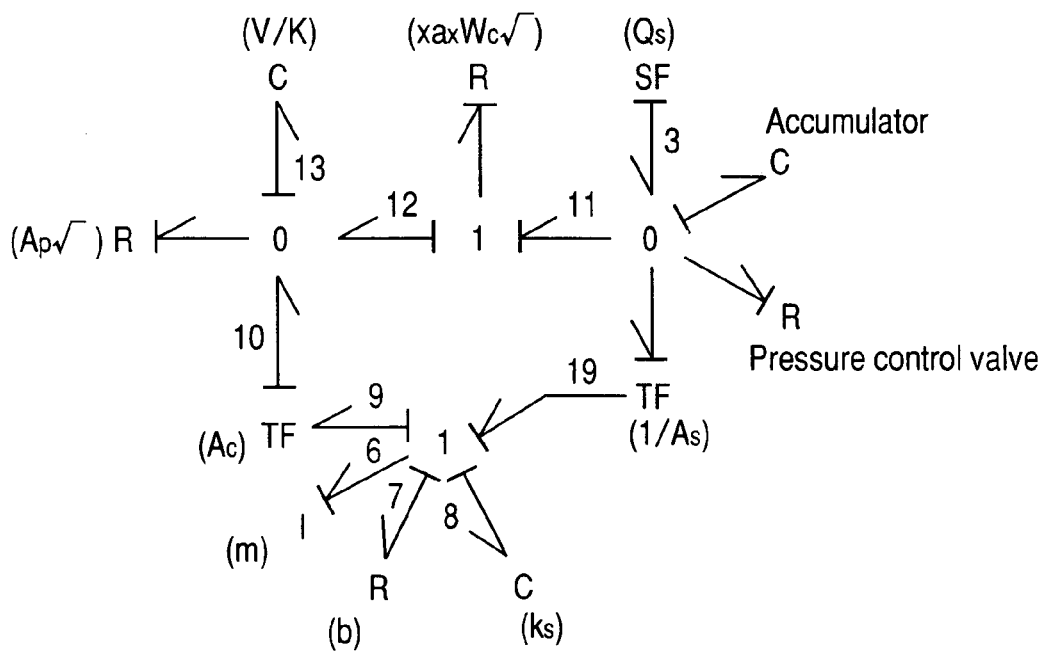
FIG. 5 is a bond graph model diagram of the hydraulic actuator according to the present invention.

And now it is possible to input directly into a bond graph by using a devoted program to simulate the behavior of the system. A bond graph model of the present actuator is shown in FIG. 5.

Figure 6:
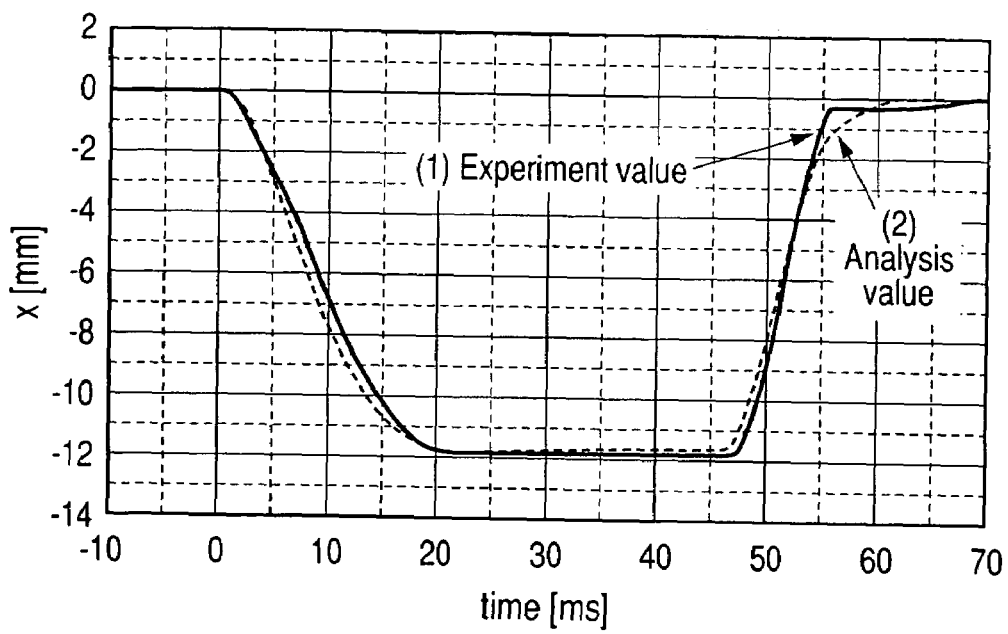
FIG. 6 is a graph showing the test result and simulation result of valve displacement.

The test result of displacement of a prototype of a valve manufactured based on the bond graph analysis is shown by the curve (1) in FIG. 6. The simulation result obtained by a bond graph analysis is also shown by the curve (2). In FIG. 6, the vertical axis represents the displacement of the valve x (mm), and the horizontal axis represents time (ms). The test conditions for FIG. 6 are Ps=14 MPa, and a repetition frequency of 6 Hz. The valve is opened completely (x=-12 mm) from the completely closed state (x=0 mm), is made to land at a reduced speed and is kept completely closed by the force of a spring and hydraulic pressure. This landing at a reduced speed produces almost no landing noises.

The result shown in FIG. 6 reveals a response time of 20 ms which is relatively slow. This is considered due to the fact that the total mass including the valve, piston and coupling is heavy amounting to 430 g, and the current of the high-speed electromagnetic valve takes approximately 5 ms to rise. And it is possible to improve these points by making the whole valve system lighter and by improving the driver. And FIG. 6 reveals that the test values (1) and the simulation values (2) agree quite closely, and the conformity of the simulation analysis by a bond graph and the actual result has been confirmed.

Figure 7:
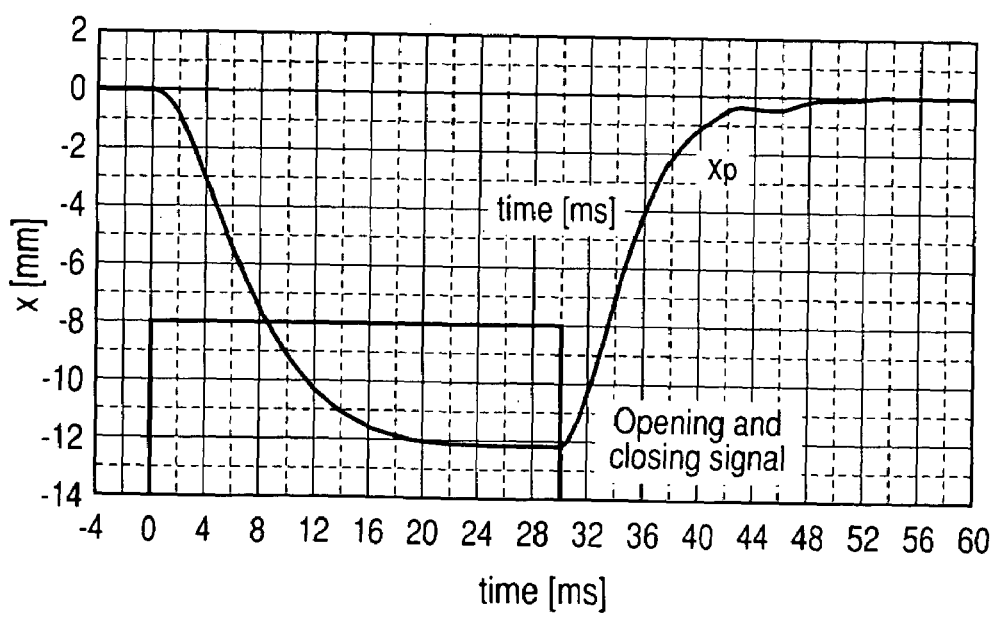
FIG. 7 is a graph showing an example of the simulation result of valve displacement analyzing by a reduced condition of the flow rate coefficient of the feedback slot.

We will now proceed to FIG. 7. FIG. 7 shows examinations made on the "flow rate coefficient" that shows theoretically the flow rate in the feedback slot relative to the experiment values of FIG. 6, and shows an example of simulation result of valve displacement obtained by analyzing the flow rate coefficient in the feedback slot by reduced conditions.

Noting the behavior of the valve at the landing time of the valve shown in FIG. 6 above, one finds that the experiment values (1) and the analysis values (2) of FIG. 6 are somewhat deviated from each other, and in the case of the experiment value (1) the valve shows a strong speed reduction effect when it is near x=-0.5 mm. This is considered due to the fact that the flow rate coefficient has fallen down because of a reduced opening area of the feedback slot near landing. FIG. 7 shows the bond graph analysis result when a calculation is made by reducing the flow rate coefficient from 0.7 to 0.2 when the valve is at x=-0.5 mm, and the experiment value of FIG. 6 and the analysis value of FIG. 7 agree relatively closely.

Figure 8:
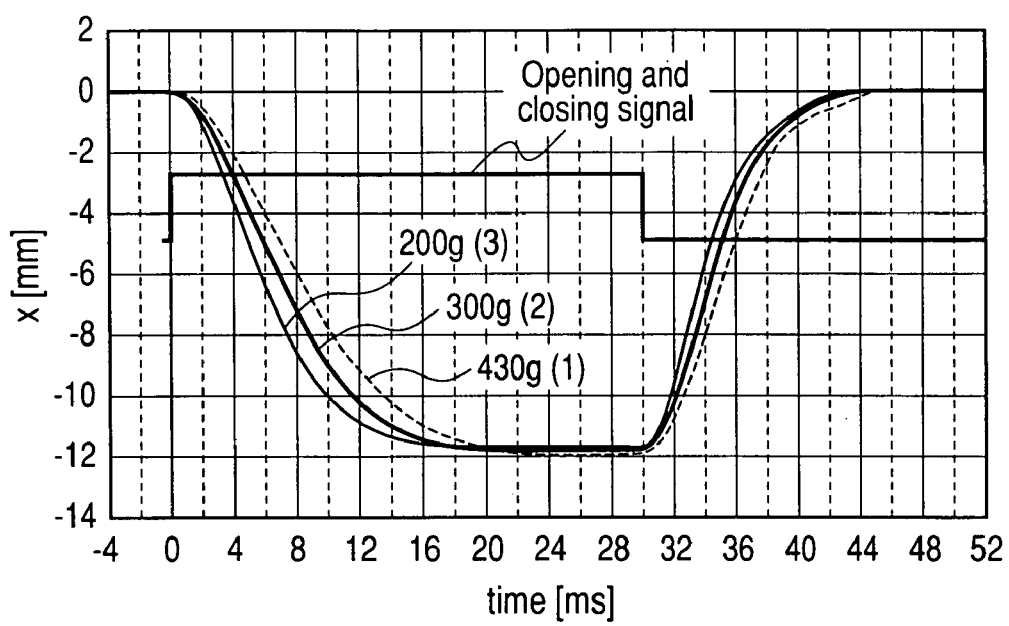
FIG. 8 is a graph showing the simulation result of the effect of the valve mass on the responsiveness of the valve.

Then, we will describe FIG. 8. FIG. 8 shows the result of examining the effect of valve mass m on the responsiveness of the valve when the pilot valve is opened and closed by steps as shown by the opening and closing signals. In FIG. 8 also, the vertical axis shows the displacement of the valve x (mm) and the horizontal axis shows time (ms). X=0 mm represents the wholly closed state of the valve. The variable mass of the valve is set at three values of (1) 430 g, (2) 300 g and (3) 200 g. The comparison of simulation results with these values is shown in FIG. 8.

FIG. 8 shows that, when the variable mass of the valve is reduced from 430 g to 200 g, both the opening time and closing time of the valve can be accelerated by approximately 5 msec. As for the valve behavior at the time of landing, the inclination created in the feedback slot of the hydraulic piston reduces the channel to the control chamber and brings about a speed reducing effect on the valve, and a smooth landing prospect can be expected from the result of FIG. 8.

Figure 9:
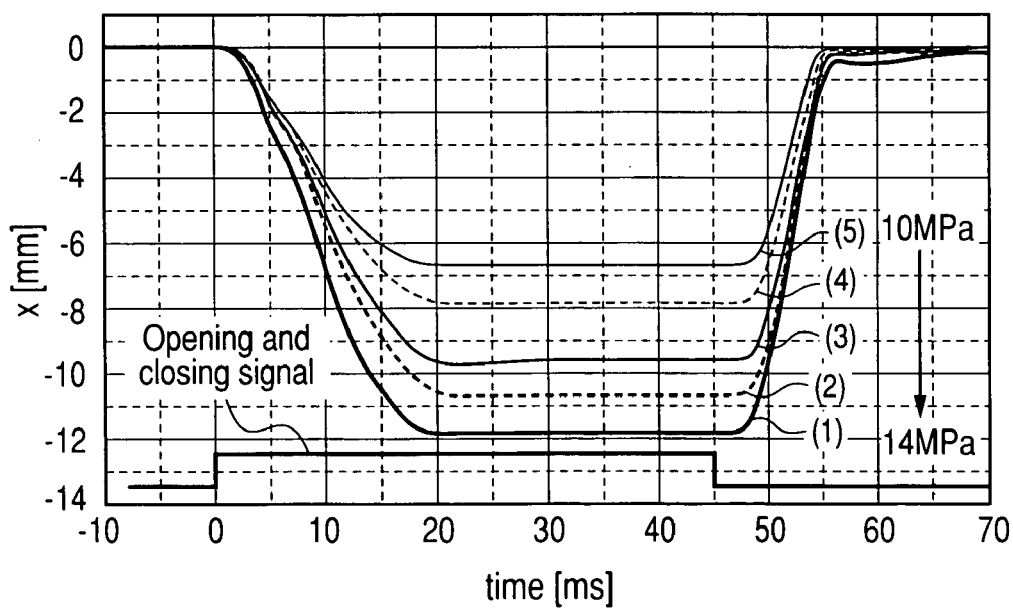
FIG. 9 is a graph showing the results of experiments related with the variable control of the lift of the valve.

Then, we will describe FIG. 9. FIG. 9 shows the experiment results concerning the variable control of the valve lift. As the present actuator has a controlling function of the position of fluid as described above, it is necessary to change pressure to make the valve lift variable. Therefore, FIG. 9 shows the results of experiments conducted by increasing in step ((5)-(1)) the supply pressure from 10 MPa to 14 Mpa.

FIG. 9 shows that the maximum displacement of the valve grows proportionally larger from 6.8 mm (10 MPa) in (5) to 12 mm (14 MPa) in (1), which shows that valve lift can be variably controlled by means of pressure. Therefore, as described above, it is possible to variably control valve lift by using an electro-hydraulic proportional control valve as the pilot valve 5 for a hydraulic pressure release control valve in FIG. 1. Incidentally, a high control hydraulic pressure brings about the problem of the valve being unable to start opening operation due to the generation of a negative pressure resulting from an increased flow rate near the valve seat of the control valve. Consequently, it is preferable to use a well-known proportional control valve having an oil inlet for compensating the negative pressure as an electro-hydraulic proportional control valve.

Figure 10:
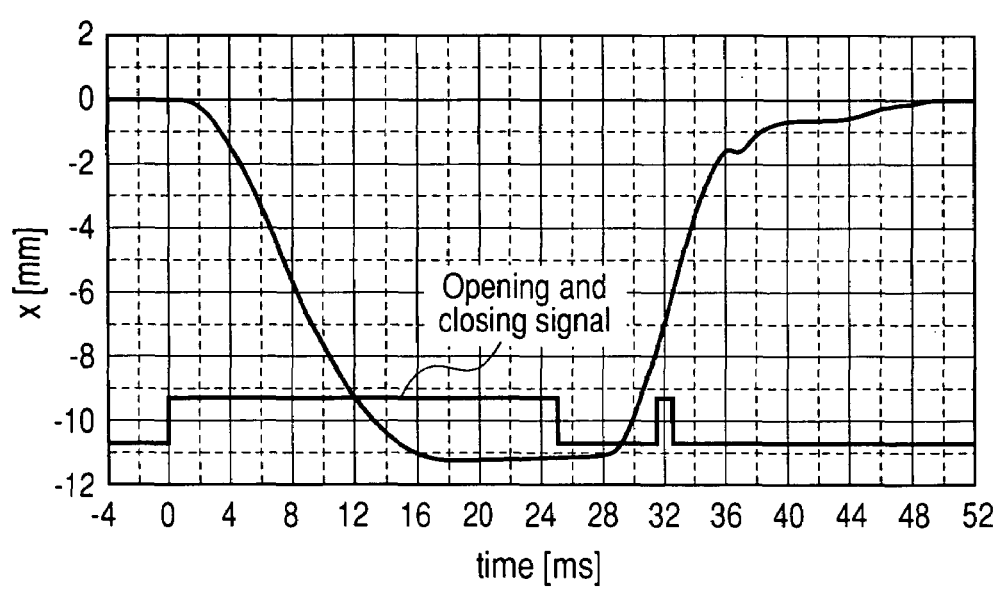
FIG. 10 is a graph showing an example of the simulation result of valve displacement following a two-pulse landing control.
Figure 11:
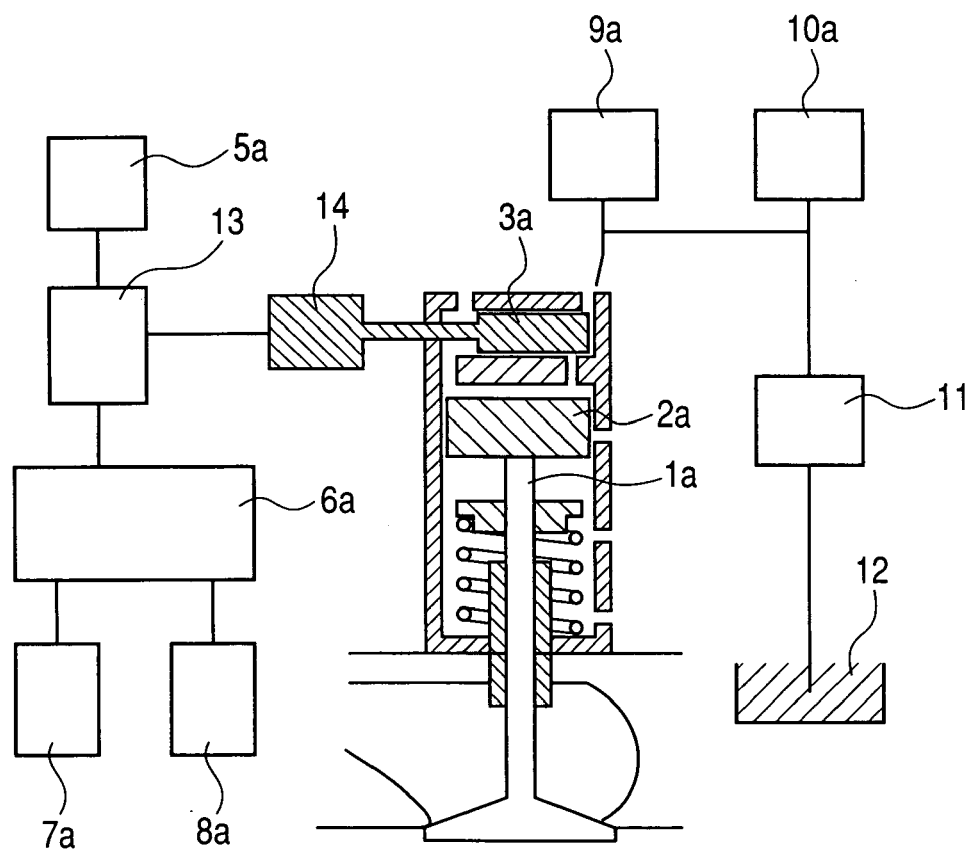
FIG. 11 is a schematic diagram showing an example of configuration of the valve drive system disclosed in the Patent Document 3.

Then, we will describe FIG. 10. FIG. 10 shows an example of simulation result of valve displacement when the control method according to claim 8 of the present invention, in other words a landing control method called "two-pulse landing control" is carried out.

As shown in FIG. 10, for the closing operation of the valve, it is possible to set the landing speed of the valve at 0.1 mm/s by turning the hydraulic pressure release control vale from "open" to "close" followed by another opening and closing operation of the hydraulic pressure release control valve (in FIG. 10, opening and closing operation by stepped secondary control pulse near 32 ms) to close the above-mentioned valve. The execution of the above-mentioned landing control complicates the control operation. However, this is a very effective method of decelerating the landing speed of the valve and of reducing the operating noises of the valve.

In order to stably control landing as mentioned above, it is necessary to detect the displacement of the valve, and to output the secondary control pulse based thereon at appropriate timing. Therefore, it is preferable to set output timing on the experimental basis and not to install any displacement meter.

INDUSTRIAL APPLICABILITY

As described above, according to the present invention, a hydraulic actuator comprising a reciprocal hydraulic piston, a hydraulic cylinder and a hydraulic pressure source wherein said hydraulic piston has a larger area exposed to pressure on the side of the control chamber than on the side of oil supply chamber of said hydraulic cylinder, wherein said hydraulic piston has, in its outer peripheral part, a slot connecting said oil supply chamber side with the control chamber side in the direction of shaft and the cross sectional area of the slot in the direction of said shaft changes according to the displacement of the hydraulic piston in the direction of its shaft, and said control chamber has a hydraulic pressure release control valve;

and, as inventions wherein the hydraulic actuator described above is applied to a variable valve system of internal combustion engine, a variable valve system of internal combustion engine for opening and closing a suction valve for aspirating gas into the internal combustion engine and an exhaust valve for exhausting combustion gas by a hydraulic actuator through a coupling and a spring for the valve, and for variably controlling the opening and closing timing and the opening and closing time of said valve, wherein the hydraulic actuator according to said claim 1 or claim 2 is used as said hydraulic actuator, and said valve is variably controlled by controlling said hydraulic pressure release control valve;

therefore, it is possible to provide a variable valve system for internal combustion engine that is a cam-less and sensor-less, and a hydraulic actuator that enable to reduce power consumption and to improve response speed.

Furthermore, the use of an electro-hydraulic proportional control valve for the hydraulic release control valve mentioned above enables to variably control the valve including the variable control of the opening and closing timing of the valve, opening and closing time of the same and valve lift.

In addition, the adoption of a structure wherein the cross sectional area of the slot in the direction of the shaft gradually decrases as the hydraulic piston displaces in the closing direction of the valve enables to mitigate and decelerate the landing speed of the valve and thus enables to control the landing speed of the valve in such a way that a smooth landing of the valve may be realized. And the adoption of the two-pulse landing control method described above will enable to decelerate further the landing speed and to reduce the valve noises.

The conventional mechanical cam engine had a problem of giving rise to violent knocking resulting in the impossibility of putting it into practical use at a high-speed and high-load working condition. However, when the structure of the present invention is applied to internal combustion engines, in particular to the aforementioned LPG engine or the CNG engine, as the opening and closing timing of suction valve can be freely controlled, the compression ratio can be freely controlled and the problem mentioned above can be solved. In addition, as suction efficiency improves even for the present gasoline engine and Diesel engine, fuel efficiency is expected to improve by 5–10%, and the application of the present hydraulic actuator to machine tools and other general industrial uses can be expected.

The invention claimed is:

1. A hydraulic actuator comprising a reciprocal hydraulic piston, a hydraulic cylinder and a hydraulic pressure source wherein said hydraulic piston has a larger area exposed to pressure on the side of the control chamber than on the side of oil supply chamber of said hydraulic cylinder, wherein
   said hydraulic piston has, in its outer peripheral part, a slot connecting said oil supply chamber side with the control chamber side in the direction of shaft and the cross sectional area of the slot in the direction of said shaft changes according to the displacement of the hydraulic piston in the direction of its shaft, and said control chamber has a hydraulic pressure release control valve.

2. The hydraulic actuator according to claim 1, wherein said hydraulic pressure release control valve is a solenoid controlled pilot operated valve.

3. The hydraulic actuator according to claim 1 wherein said hydraulic pressure release control valve is an electro-hydraulic proportional control valve.

4. A variable valve system of internal combustion engine for opening and closing a suction valve for aspirating gas into the internal combustion engine and an exhaust valve for exhausting combustion gas by a hydraulic actuator through a coupling and a spring for the valve, and for variably controlling the opening and closing timing, the opening and closing time and the lift of said valve, wherein
   the hydraulic actuator according to said claim 3 is used as said hydraulic actuator, and said valve is variably controlled by controlling said hydraulic pressure release control valve.

5. The variable valve system for internal combustion engine according to claim 4, wherein the cross sectional area of said slot in the direction of the shaft gradually decreases as said hydraulic piston displaces in the closing direction of said valve.

6. The variable valve system for internal combustion engine according to claim 5, wherein the structure of the gradually decreasing the cross sectional area of said slot consists of gradually changing the groove depth of the slot while the groove width is kept constant.

7. The control method of the variable valve system according to claim 5, wherein, for the closing operation of said valve, said hydraulic pressure release control valve is switched from OPEN to CLOSE followed by at least another operation of opening and closing the hydraulic pressure release control valve to close said valve.

8. A variable valve system of internal combustion engine for opening and closing a suction valve for aspirating gas into the internal combustion engine and an exhaust valve for exhausting combustion gas by a hydraulic actuator through a coupling and a spring for the valve, and for variably controlling the opening and closing timing and the opening and closing time of said valve, wherein
   the hydraulic actuator according to said claim 1 is used as said hydraulic actuator, and said valve is variably controlled by controlling said hydraulic pressure release control valve.

9. The variable valve system for internal combustion engine according to claim 8, wherein the cross sectional area of said slot in the direction of the shaft gradually decreases as said hydraulic piston displaces in the closing direction of said valve.

10. The variable valve system for internal combustion engine according to claim 9, wherein the structure of the gradually decreasing the cross sectional area of said slot consists of gradually changing the groove depth of the slot while the groove width is kept constant.

11. The control method of the variable valve system according to claim 8, wherein, for the closing operation of said valve, said hydraulic pressure release control valve is switched from OPEN to CLOSE followed by at least another operation of opening and closing the hydraulic pressure release control valve to close said valve.

* * * * *